United States Patent [19]

Weiler

[11] Patent Number: 5,718,346

[45] Date of Patent: *Feb. 17, 1998

[54] TORQUE-RESISTANT CLOSURE WITH A LUER INSERT FOR A HERMETICALLY SEALED CONTAINER

[75] Inventor: Gerhard H. Weiler, South Barrington, Ill.

[73] Assignee: Automatic Liquid Packaging, Inc., Woodstock, Ill.

[*] Notice: The term of this patent shall not extend beyond the expiration date of Pat. No. 5,595,314.

[21] Appl. No.: 805,245

[22] Filed: Feb. 24, 1997

Related U.S. Application Data

[62] Division of Ser. No. 253,111, Jun. 2, 1994, Pat. No. 5,649,637.

[51] Int. Cl.[6] .............................. B65D 1/02; A61B 19/00
[52] U.S. Cl. .......................... 215/50; 215/48; 215/251; 215/253; 215/355; 604/403; 604/905
[58] Field of Search ........................ 215/40, 43, 48, 215/50, 251, 253, 355–357; 128/912; 604/905, 403

[56] References Cited

U.S. PATENT DOCUMENTS

| 4,569,456 | 2/1986 | Weiler et al. | |
|---|---|---|---|
| 4,821,897 | 4/1989 | Weiler | 215/253 X |
| 4,901,873 | 2/1990 | Weiler | |
| 4,997,217 | 5/1991 | Kunze | 128/912 X |
| 5,398,679 | 3/1995 | Freed | 128/912 X |
| 5,451,374 | 9/1995 | Molina | 604/403 X |
| 5,501,676 | 3/1996 | Niedospial et al. | 604/403 X |
| 5,533,993 | 7/1996 | Maier | 604/403 X |
| 5,569,235 | 10/1996 | Ross et al. | 604/403 |
| 5,595,314 | 1/1997 | Weiler | 215/50 |

*Primary Examiner*—Allan N. Shoap
*Assistant Examiner*—Robin A. Hylton
*Attorney, Agent, or Firm*—Olson & Hierl, Ltd.

[57] ABSTRACT

An improved closure insert is provided for throat region of a blow-molded container. This closure insert is provided with a rough perimeter and is permanently molded into the container throat region during container formation from a parison. The resulting seal resists loosening or disturbance when off-axis force or torque force is applied to the closure insert during container opening.

6 Claims, 3 Drawing Sheets

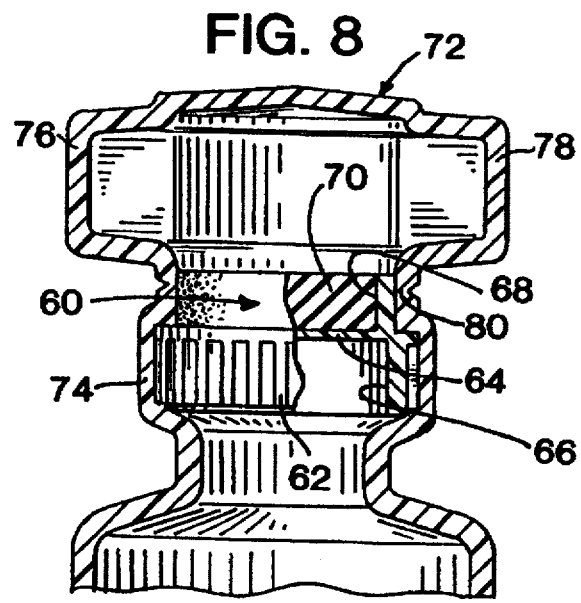
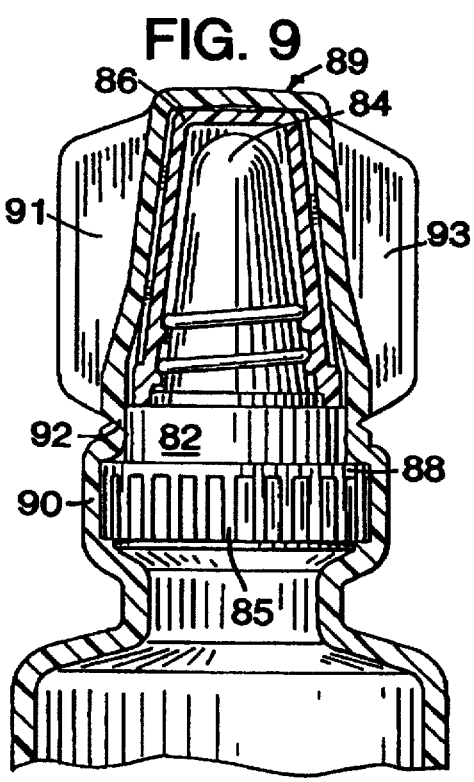
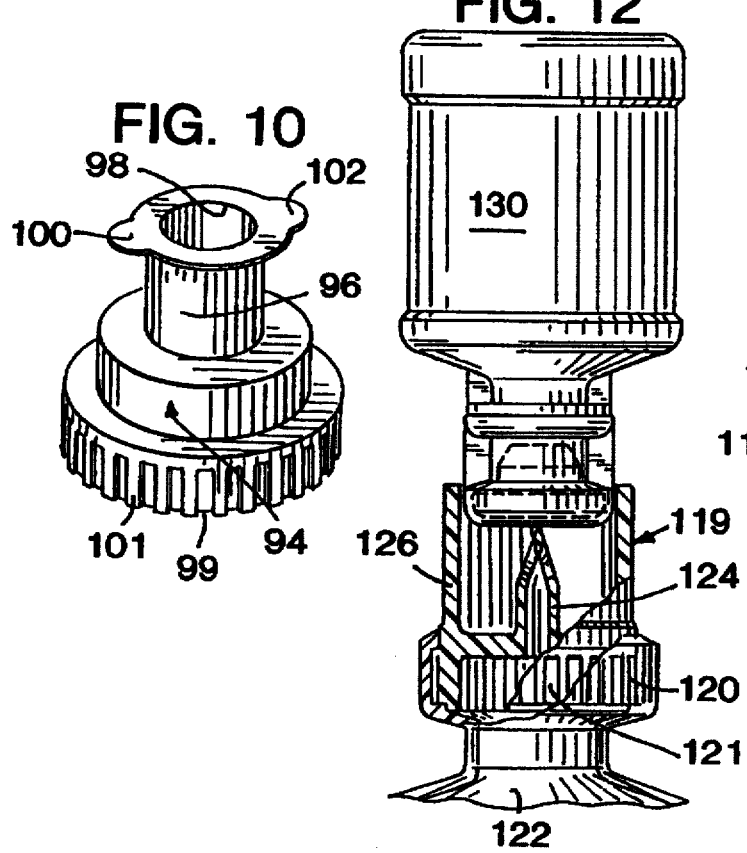
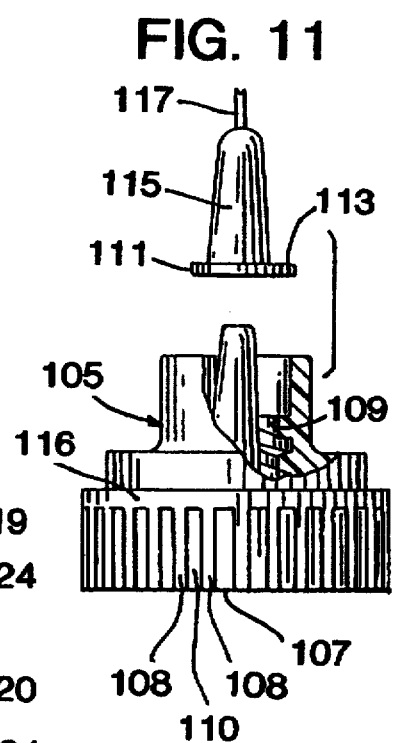

5,718,346

1

TORQUE-RESISTANT CLOSURE WITH A LUER INSERT FOR A HERMETICALLY SEALED CONTAINER

This application is a division of application Ser. No. 08/253,111, filed Jun. 2, 1994, now U.S. Pat. No. 5,649,637.

FIELD OF THE INVENTION

This invention relates to improved closures for the throat region of hermetically sealed, blow-molded containers and in particular to blow molded, filled and sealed container structures that incorporate such closures.

BACKGROUND OF THE INVENTION

Hermetically-sealed containers can be readily produced by the so-called blow/fill/seal techniques. Utilizing such techniques, a container body is first blow molded from an extruded parison segment, then charged (or filled) with desired liquid or solid contents, and thereafter immediately sealed by a preformed insert while additionally molding the parison segment at the container neck and throat region about the inserted, preformed closure subassembly. See, for example, the container structure disclosed in U.S. Pat. No. 4,596,110 to Weiler.

The hermetically sealed container structures that result from such a blow, fill and seal container molding procedure, especially those with a removable overcap as shown in the aforementioned patent, are very useful and have come into widespread usage. However, under certain conditions of relatively extreme usage, the preformed, inserted closure can become disengaged or loosened from its engagement with the material forming the container throat region. Such disengagement not only raises the risk of environmental contamination of the container contents, but also can cause dispensing problems when the container contents is about to be used after the container has been opened by twisting off the overcap that protects the insert. Examples of such extreme usage conditions include excessive torque applied to the inserted closure or an excessive force applied in a direction away from the container longitudinal axis.

A practical means for overcoming this loosening problem is needed and has been diligently sought, but has not been easy to achieve. However, the present invention provides a practical solution to this problem and permits the utilization of a wide variety of pre-molded inserts in conjunction with hermetically sealed, molded containers.

SUMMARY OF THE INVENTION

The present invention contemplates a preformed closure insert permanently received in the neck portion of a container formed from a thermoplastic material wherein the insert is provided about the perimeter thereof with a rough surface that provides increased contact area between the insert and the inner surface of the container neck or throat portion contiguous therewith. The aforementioned rough surface can be in the form of a band of substantially axially extending and circumferentially spaced ribs, can be knurled, serrated, undulating, or otherwise roughened.

The closure insert can be a single piece molded item such as a nozzle with or without a pierceable membrane, or a subassembly constituted by two or more parts.

A container embodying the present invention is made from thermoplastic material and comprises a body portion that defines an access opening at one end and terminates in a neck portion unitary therewith and further defining an open throat region. A closure insert of the type described hereinabove and provided with a rough perimeter surface is situated within the open throat region and in sealing contact with the thermoplastic material that defines the neck portion. A cover structure unitary with the container neck portion encapsulates the closure insert and is constituted by a removable overcap delineated from the neck portion by a frangible web that abuts the insert article above the rough perimeter surface and eliminates touch contamination of the dispensing aperture or nozzle.

BRIEF DESCRIPTION OF THE DRAWINGS

In the drawings,

FIG. 8 is a fragmentary elevational view, partly in section, showing an alternative embodiment of a container structure of this invention;

FIG. 9 is a fragmentary elevational view, partly in section, showing yet another embodiment of a container structure of this invention;

FIG. 10 is a perspective view of an insert suitable for practicing the present invention and showing a male luer lock connector provided with external lugs;

FIG. 11 is a side elevational view, partly in section, and showing a male luer lock connector provided with internal threads for engaging a hypodermic needle; and FIG. 12 is a side elevational view, partly in section and showing a spike surrounded by a skirt for guidance and equipped with a rough perimeter surface in accordance with the present invention.

DETAILED DESCRIPTION OF PREFERRED EMBODIMENTS

Figure 1:
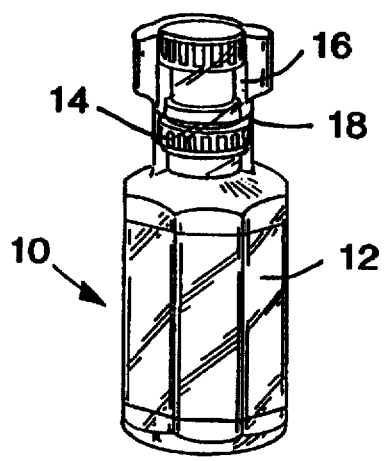
FIG. 1 is a perspective view of one embodiment of a container structure of the invention in its blow molded, filled and sealed configuration.
Figure 2:
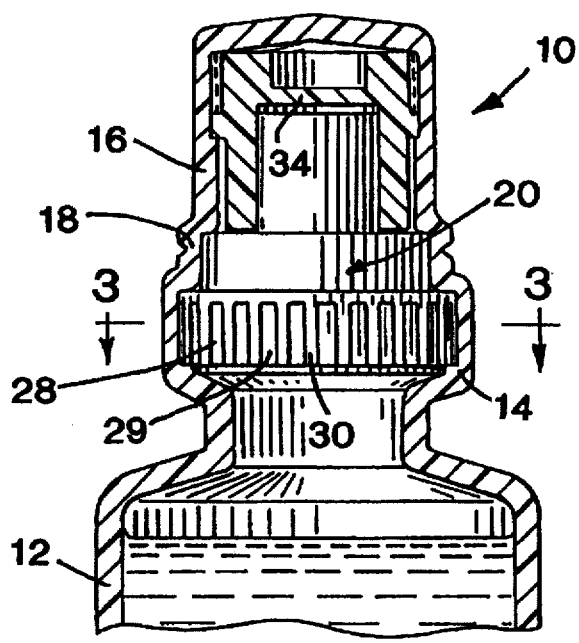
FIG. 2 is an enlarged fragmentary sectional view of the container structure of FIG. 1 in elevation.

Referring to FIGS. 1 and 2, a hermetically sealed, thermoplastic container 10 embodying the present invention includes a body portion 12, terminating in a neck portion that also defines a throat portion 14 unitary with the neck portion as well as with the body portion, and a removable overcap 16 unitary with throat portion 14 and delineated by frangible web 18. Received within throat portion 14 is closure insert 20 constituted by a cap 22 and hollow body 24 (FIGS. 2 and 4) that defines an open, axial access passageway 26 to container body portion 12. Hollow body 24 is provided with a band of rough perimeter surface 28 into which is molded the thermoplastic material from which container 10 is fabricated.

The thermoplastic material can be a conventional molding material such as high density polyethylene, low density polyethylene, polypropylene, and the like, compatible with the contemplated container contents. Containers embodying the present invention can have a wide variety of shapes and capacities.

The closure inserts contemplated by the present invention are preformed, for example by injection molding, and can have a wide variety of dispensing configurations depending upon contemplated end use. Single piece inserts as well as subassemblies are contemplated, as will be discussed and illustrated in greater detail hereinbelow. However, in all instances the closure insert is provided with a rough perimeter, e.g., ribbed, knurled, serrated, etc., that provides an increased surface area for intimate contact with the thermoplastic container material during molding.

Figure 3:
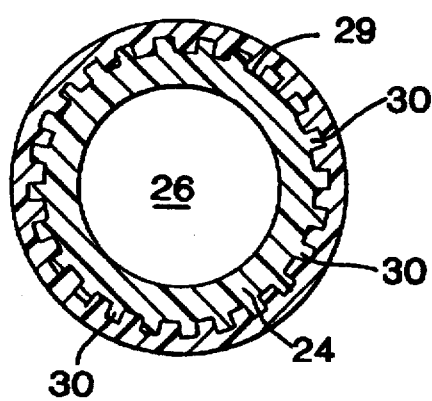
FIG. 3 is a sectional view taken along the plane 3—3 of FIG. 2.
Figure 4:
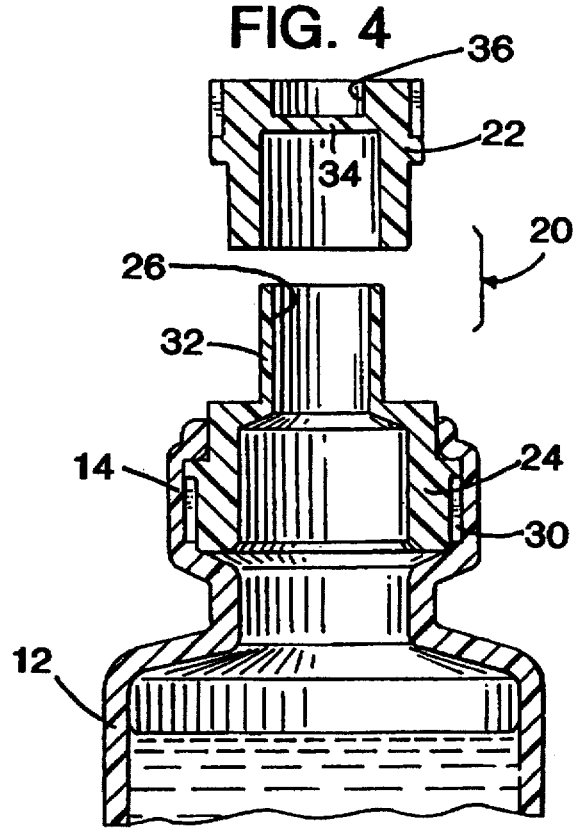
FIG. 4 is a view similar to FIG. 2, but with all portions in section, the overcap broken away and removed, and the closure subassembly exploded.

The rough outer perimeter surface 28 of closure insert 20, shown in FIGS. 2, 3 and 4, is in the form of substantially uniformly spaced ribs 30 generally parallel to the longitudinal axis of access passageway 26. As best seen in FIG. 3, the thermoplastic material of container throat portion 14 fills completely the interstices or channels 29 between adjacent ribs 30 and immobilizes the insert by forming a permanent seal between the closure insert 20 and throat portion 14 during molding. Moreover, the rough perimeter surface of the closure insert permits more of the thermoplastic material to be retained in the container throat region as the material is compressed about the insert during molding. This, in turn, thickens the container wall about the insert and thereby increases the rigidity of the throat region and strengthens the throat region against later dislodgement of the closure insert as the container is being opened in preparation for use.

The rough perimeter surface of the closure insert provides an actual contact surface area that is considerably larger than the apparent contact surface area. Preferably the actual-to-apparent contact surface area ratio is at least about 3.

Closure insert 20 is a subassembly that includes removable cap 22 for sealing access passageway 26. Cap 22 is also provided with a ribbed external surface into which a portion of overcap 16 is molded so that cap 22 is in intimate contact with and can be removed together with overcap 16 when frangible web 18 is severed. If, on the other hand, it is preferred for cap 22 to remain in place, maintaining access passageway 26 sealed while and after overcap 16 is removed, overcap 16 is molded in a known manner in a hollow configuration so as to remain spaced from cap 22 as the container is fabricated.

In the latter case, access to container contents can be gained in several ways, to wit, by removing the cap 22 from stem 32, as illustrated in FIG. 4, or by perforating membrane or web 34 in cap recess 36 by means of a draining spike or a cannula. Stem 32 can have controlled inside and/or outside diameters, luer tapers, and the like features to facilitate interconnection with other receptacles or dispensing devices.

Figure 5:
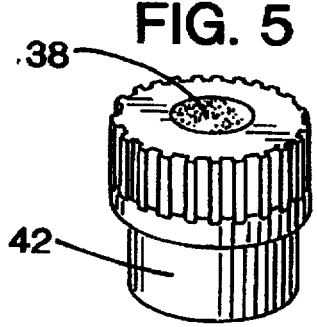
FIG. 5 is an enlarged perspective view of a cap provided with a pierceable multiple entry membrane.

For multiple entries into container contents without removal of cap 22 from stem 32, cap recess can be filled with an elastomeric material 38, e.g., rubber, as illustrated in FIG. 5 for cap 42. Cap 42 is in all other respects the same as cap 22 shown in FIGS. 2 and 4.

Figure 6:
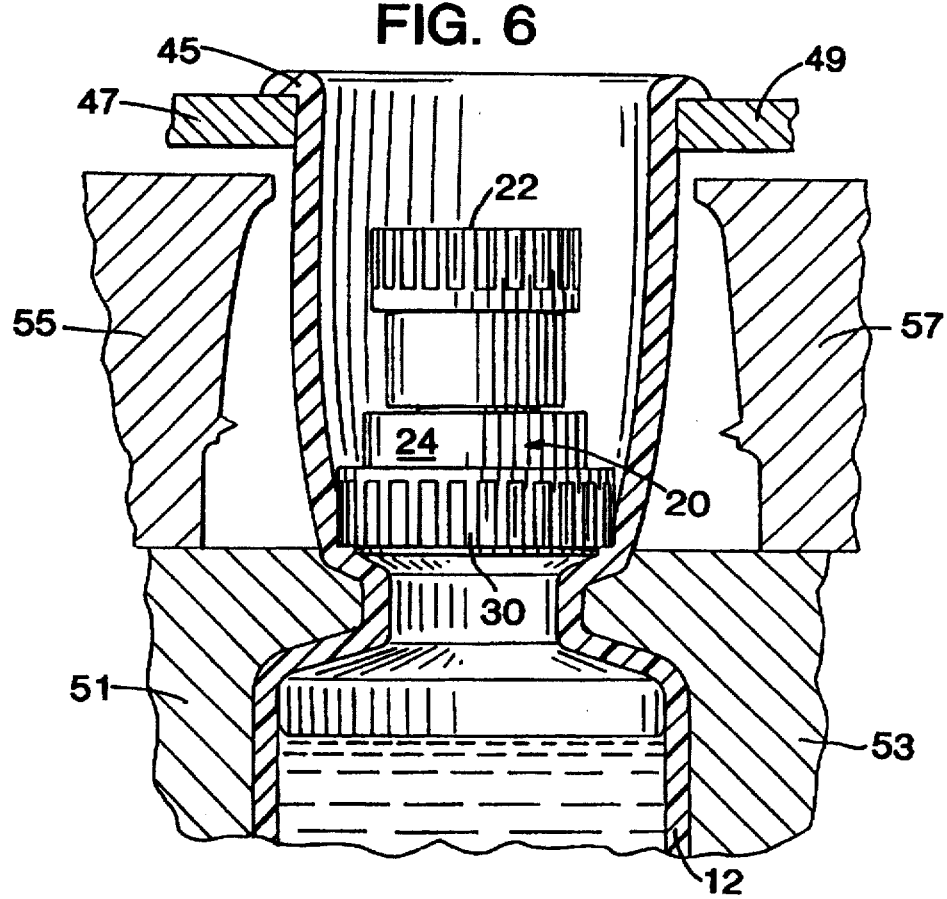
FIG. 6 is an elevational view showing a parison section partly molded and with a closure insert subassembly positioned in the container throat region.
Figure 7:
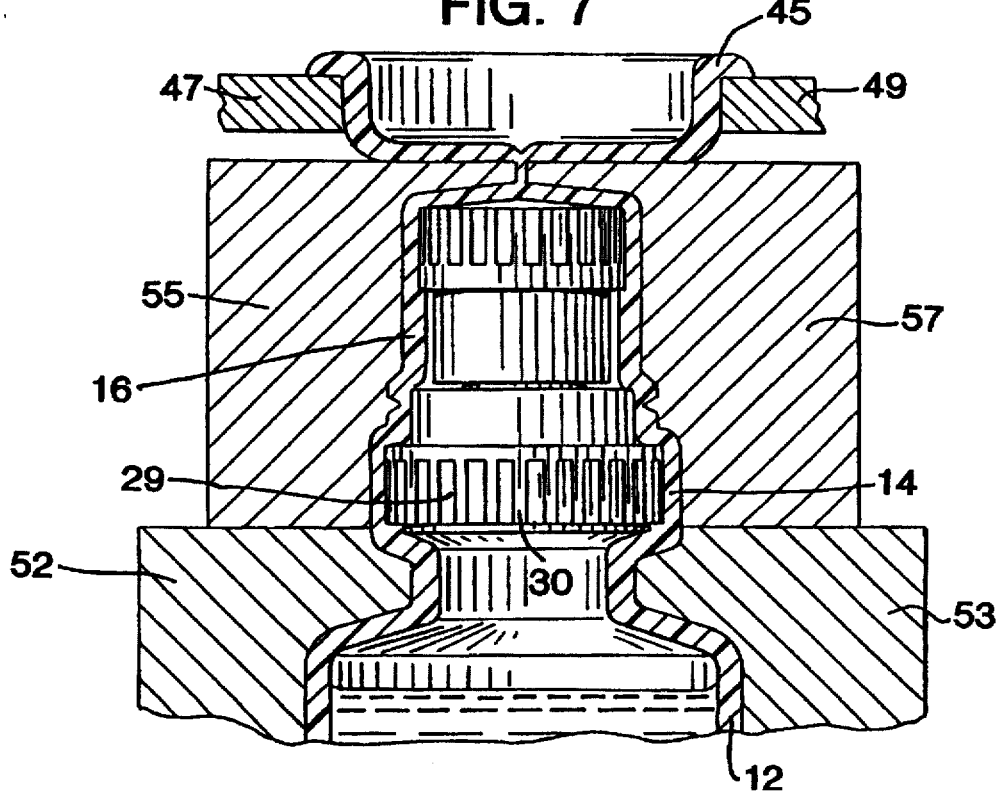
FIG. 7 is an elevational view similar to that of FIG. 6 but showing the parison section fully molded about the closure insert subassembly.

The insertion of a preformed closure insert 20 into a thermoplastic container during container fabrication is illustrated in FIGS. 6 and 7. An extruded parison segment 45 is held by vacuum assisted holding jaws 47 and 49 in position between main mold halves 51 and 53 as container body portion 12 is formed in a known manner, for example, as described in U.S. Pat. No. 4,901,873 to Weiler et al. Thereafter, preformed closure insert 20 is positioned as shown in FIG. 6. Next, sealing mold halves 55 and 57 are moved inwardly toward one another (FIG. 7) to compress the remaining, upper parison portion about closure insert 20 so as to form throat region 14 as well as overcap 16 while urging the thermoplastic material of the parison into the interstices between adjacent longitudinal ribs 30. In this manner, a closure insert is effectively and expeditiously permanently secured within throat region 14.

FIGS. 8 through 12 illustrate the diverse types of closure inserts that can be accommodated while utilizing the present invention.

Referring to FIG. 8, closure insert 60 is a hollow, substantially cylindrical segment provided with spaced, longitudinally extending ribs 62 about its periphery. Pierceable, non-coring membrane 64 extends across insert 60 to seal access passageway 66. A rubber composition 70 fills outer recess 68 for multiple entry applications. Hollow overcap 72, unitary with throat region, protects pierceable insert 60 against contamination. Overcap 72 can be removed by grasping wings 76 and 78 and twisting so as to break frangible web 80.

FIG. 9 shows closure insert subassembly 82 that comprises nozzle 84 equipped with a threaded protective cap 86. Base 88 of nozzle 84 is provided with peripheral, spaced ribs 85 in intimate contact with throat region 90. Hollow overcap 89 is unitary with container throat region 90 and is connected thereto by frangible web 92. Wings or tabs 91 and 93 on overcap 89 facilitate its manipulation, especially by senior citizens or those suffering from arthritis, when readying nozzle 84 for dispensing of container contents.

FIG. 10 illustrates a closure insert provided with several interconnecting means. In particular, closure insert 94 comprises hollow stem 96 that defines access aperture 98 having a controlled inside diameter, e.g., a luer taper for receiving a luer fitting. Stem 96 terminates in outwardly extending lugs 100 and 102 sized to engage luer lock threads, e.g., of the type shown in FIG. 11. Base 99 of insert 94 is provided with peripheral, axially aligned and spaced ribs 101 for engaging the thermoplastic material of a container throat region and receiving some of the thermoplastic material therebetween.

FIG. 11 shows a male luer lock connector 105 having a ribbed base 107 and equipped with internal threads 109 for engaging lugs 111 and 113 on hub 115 on hypodermic needle 117. Ribbed base 107 is provided with a plurality of spaced, substantially parallel ribs 108 with channels or interstices 110 therebetween. Ribs 108 merge into a common solid peripheral band or ring 116 at the upper portion of base 107 and unitary therewith.

FIG. 12 shows a spike connector 119 having a ribbed base 121 of similar configuration to that shown in FIG. 11 and embedded in throat region 120 of thermoplastic container 122. Transfer spike 124 is surrounded by guide skirt 126 which facilitates the penetration of spike 124 into a stoppered container 130 so as to drain the contents thereof as container 130 is urged against spike 124.

The foregoing specification and the drawings are to be taken as illustrative but not limiting of the present invention. Still other closure insert configurations utilizing the spirit and scope of the present invention are possible, and will readily present themselves to those skilled in the art.

I claim:

1. A hermetically sealed container of a thermoplastic material comprising:

(a) a body portion having an upper end terminating in a neck portion unitary therewith;

(b) a throat portion unitary with said neck portion;

(c) a preformed closure insert immobilized within said throat portion; said closure insert having a rough perimeter surface defined by axially aligned fibs uniformly spaced from one another and an axially extending passageway defined therethrough; and (d) a removable overcap unitary with said throat portion and delineated by a peripheral frangible web circumscribing the closure insert above the rough perimeter surface, wherein the thermoplastic material in the throat portion of the container is in intimate contact with said rough perimeter surface and wherein spaces between said ribs are filled by the thermoplastic material; said closure insert being a luer connector.

2. The container in accordance with claim 1 wherein said rough perimeter surface has an actual-to-apparent contact surface ratio of at least about 3.

3. The container in accordance with claim 1 wherein said removable overcap is hollow and is spaced from said closure insert.

4. The container in accordance with claim 1 wherein the luer connector is provided with external lugs.

5. The container in accordance with claim 1 wherein the luer connector is provided with internal threads for engaging a hypodermic needle.

6. The container in accordance with claim 1 wherein the luer connector is provided with external lugs and defines an access aperture having a luer taper.

* * * * *